US009104796B2

(12) United States Patent
Smith et al.

(10) Patent No.: US 9,104,796 B2
(45) Date of Patent: Aug. 11, 2015

(54) CORRELATION OF SOURCE CODE WITH SYSTEM DUMP INFORMATION

(71) Applicant: International Business Machines Corporation, Armonk, NY (US)

(72) Inventors: Samuel J. Smith, Southhampton (GB); Mark A. Woolley, Hursley (GB); Andrew Wright, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 13/723,815

(22) Filed: Dec. 21, 2012

(65) Prior Publication Data

US 2014/0181593 A1    Jun. 26, 2014

(51) Int. Cl.
*G06F 11/00* (2006.01)
*G06F 11/36* (2006.01)

(52) U.S. Cl.
CPC .............. *G06F 11/362* (2013.01); *G06F 11/36* (2013.01)

(58) Field of Classification Search
CPC ...................................................... G06F 11/36
USPC ............ 714/38.1, 38.11, 38.12, 38.13, 37, 39
See application file for complete search history.

(56) References Cited

U.S. PATENT DOCUMENTS

| 6,789,216 | B2 * | 9/2004 | Zagorski et al. | 714/38.11 |
|---|---|---|---|---|
| 7,181,652 | B2 * | 2/2007 | Shortz | 714/38.11 |
| 7,490,268 | B2 * | 2/2009 | Keromytis et al. | 714/38.11 |
| 8,122,517 | B2 | 2/2012 | Julin et al. | |
| 8,156,478 | B2 | 4/2012 | Sethi et al. | |
| 8,166,313 | B2 | 4/2012 | Fedtke | |
| 8,555,257 | B2 * | 10/2013 | Balasubramanian et al. | 717/130 |
| 2008/0120564 | A1 * | 5/2008 | Balasubramanian et al. | 715/771 |
| 2011/0161956 | A1 | 6/2011 | Vennam et al. | |

OTHER PUBLICATIONS

Wang, Y. et al., "Register allocation by model transformer semantics,"[online] arXiv Preprint No. arXiv:1202.5539, Feb. 24, 2012, [retrieved Dec. 21, 2012] retrieved from the Internet: <http://arxiv.org/ftp/arxiv/papers/1202/1202.5539.pdf>, 12 pgs.

Baev, I.D., "Techniques for region-based register allocation," IEEE 2009 Proc. of 7th Intl Sym. on Code Generation and Optimization, 2009, retrieved from the Internet: <http://dl.acm.org/citation.cfm?id=1545065>, 10 pgs.

"Using use distance between all pairs of automatics to map stack on a machine with small displacement instructions," IP.com Prior Art Database, Disclosure No. IPCOM000214169D, Jan. 13, 2012, retrieved from the Internet: <http://ip.com/IPCOM/000214169#>, 3 pgs.

* cited by examiner

*Primary Examiner* — Dieu-Minh Le
(74) *Attorney, Agent, or Firm* — Cuenot, Forsythe & Kim, LLC

(57) ABSTRACT

The present arrangements relate to analyzing a software error. At least one dump file created in response to a crash of software executing on a processing system can be accessed. Based on the dump file, a base version of at least one software module that was loaded when the crash occurred can be identified. Based on the dump file, maintenance that has been applied to the at least one software module also can be identified. A report recommending new corrective maintenance to be applied to the at least one software module can be generated.

17 Claims, 3 Drawing Sheets

CORRELATION OF SOURCE CODE WITH SYSTEM DUMP INFORMATION

BACKGROUND

Arrangements described herein relate to analysis of software errors.

Dump files are created when an application crashes and generates an exception code. A dump file saves program information for trouble shooting (e.g., debugging) at a later time. In particular, when a system creates a dump file, the system usually attempts to capture in the dump file information about the state of the system when the crash occurred. For example, a dump file may contain the program execution stack, which may indicate a line of code or an area of memory currently being utilized by a crashed program when the crash occurred. Accordingly, a dump file is very useful for troubleshooting the direct cause that triggered the exception code.

BRIEF SUMMARY

One or more embodiments disclosed within this specification relate to analyzing a software error.

An embodiment can include a method of analyzing a software error. The method can include accessing at least one dump file created in response to a crash of software executing on a processing system. The method also can include identifying, based on the dump file, a base version of at least one software module that was loaded when the crash occurred. The method further can include identifying, based on the dump file, maintenance that has been applied to the at least one software module. The method also can include generating, via a processor, a report recommending new corrective maintenance to be applied to the at least one software module.

Another embodiment can include a system including a processor programmed to initiate executable operations. The executable operations can include accessing at least one dump file created in response to a crash of software executing on a processing system. The executable operations also can include identifying, based on the dump file, a base version of at least one software module that was loaded when the crash occurred. The executable operations further can include identifying, based on the dump file, maintenance that has been applied to the at least one software module. The executable operations also can include generating a report recommending new corrective maintenance to be applied to the at least one software module.

Another embodiment can include a computer program product for analyzing a software error. The computer program product can include a computer readable storage medium having program code stored thereon, the program code executable by a processor to perform a method. The method can include accessing, via the processor, at least one dump file created in response to a crash of software executing on a processing system. The method also can include identifying via the processor, based on the dump file, a base version of at least one software module that was loaded when the crash occurred. The method further can include identifying via the processor, based on the dump file, maintenance that has been applied to the at least one software module. The method also can include generating, via the processor, a report recommending new corrective maintenance to be applied to the at least one software module.

DETAILED DESCRIPTION

Figure 1:
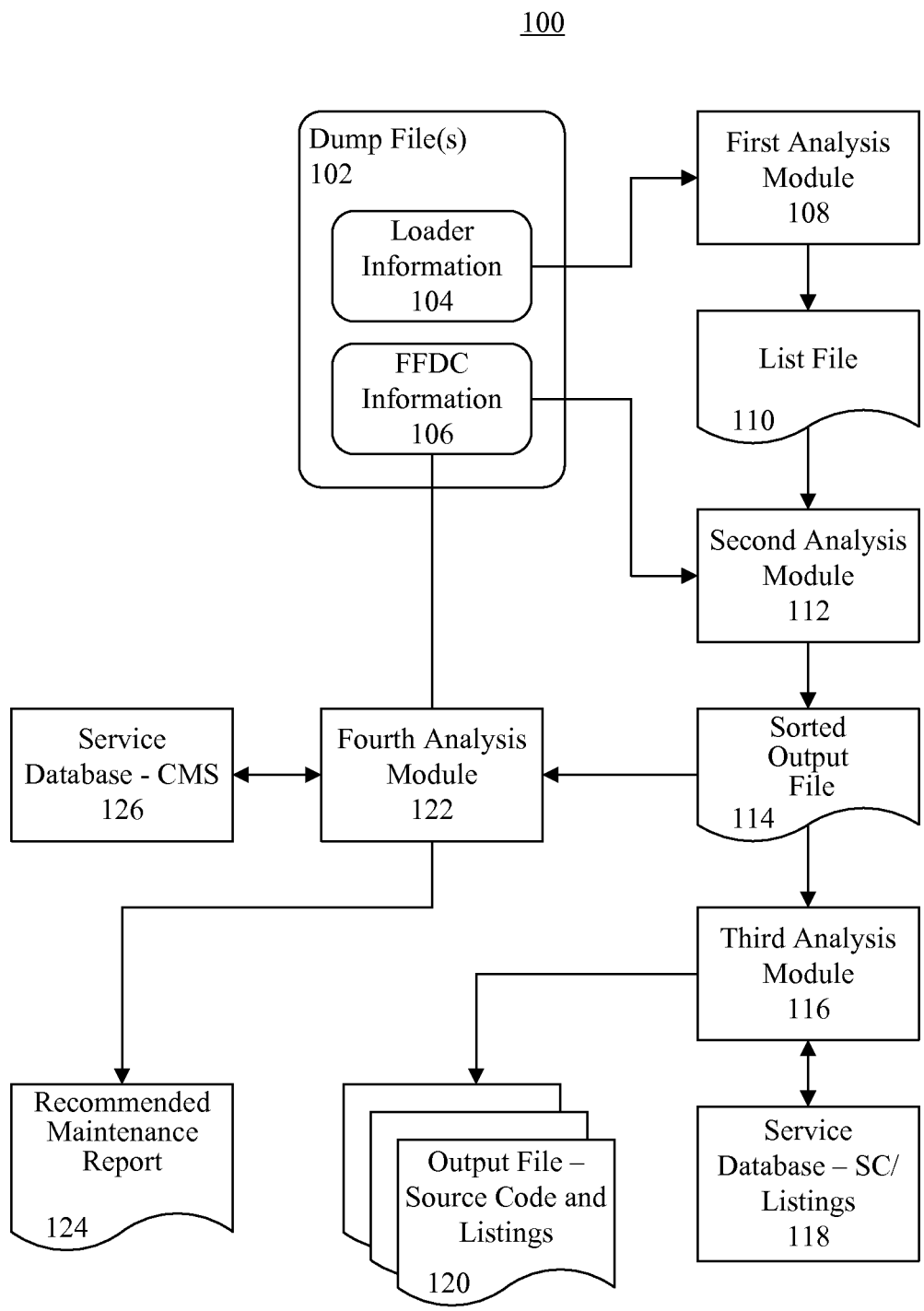
FIG. 1 is a block diagram illustrating a flow diagram for analyzing a software error in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The term computer-readable storage medium means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to correlating source code with system dump information. Specifically, when a crash of software executing on a processing system occurs, a dump file can be created. The dump file can include, for example, loader information which indicates current versions of the computer programs (hereinafter "programs") and/or modules executing on the processing system when the crash occurred, and first failure data capture (FFDC) information. The dump file can be received by a software analysis system. Based on the dump file, a base version of the programs and/or modules executing on the processing system can be identified, as well as maintenance that previously had been applied to the programs or modules. Such information can be processed to generate an output file including source code listings and a listing of maintenance updates currently applied to the software. A report recommending new corrective maintenance to be applied to the software (e.g., to software modules) also can be generated. The corrective maintenance then can be applied to mitigate the risk of future software crashes from occurring.

FIG. 1 is a block diagram illustrating a flow diagram 100 for analyzing a software error in accordance with one embodiment disclosed within this specification. When a crash of software executing on the processing system occurs, one or more dump files 102 can be created. The processing system can be configured to generate the dump file(s) 102 when such a crash occurs. The dump file 102 can include various information related to the software currently loaded on the processing system when the crash occurs, for example loader information 104 and FFDC information 106. The dump file 102 also can include various information related to program managers, which may be included in the loader information 104 or elsewhere in the dump file(s) 102. As used herein, a "program manager" is software that manages other software, such as a computer program (e.g., an application).

When, or after, the dump file 102 is generated, the dump file can be accessed, either by the processing system that generated the dump file 102 or another suitable processing system, and loaded into a software analysis application configured to perform an analysis of the dump file 102. The analysis application can include a variety of analysis modules, for example a first analysis module 108, a second analysis module 112, a third analysis module 116, and a fourth analysis module 122, configured to process the dump file 102 and generate an output file 120 and recommended maintenance report 124, as will be described herein.

The first analysis module 108 can be configured to identify a product baseline and maintenance levels from the loader information 104 contained in the dump file 102. The product baseline can indicate a base version (or versions) of software modules, and the maintenance levels can indicate updates that have been applied to the base version(s) of the software modules. In this regard, the first analysis module 108 can process the memory structures (e.g., control blocks) contained in the dump file 102 (e.g., in the loader information 104) to locate areas that contain information about software modules that are loaded and potentially executing on the processing system when the crash occurs. As used herein, the term "software module" means a computer program, or a portion of a computer program, and hereinafter will be referred to simply as "module."

Based on the analysis of the dump file 102, the first analysis module 108 can generate a list file 110 that includes a list of modules and maintenance levels that have been applied to the modules. Such information can be indicated by the loader information 104, for example as entries in a loader domain and a program manager domain. A domain is analogous to a software class or software subsystem, and comprises executable code and data. The list file 110 can be generated as an XML file, or generated using any other suitable file format.

The second analysis module 112 can receive the list file 110 from the first analysis module 108, and can extract the FFDC information 106 from the dump file 102. The FFDC information 106 can identify failure codes, such as end/termination (abend) codes, and corresponding modules related to the software crash. The second analysis module 112 can parse from the list file 110 any entries for modules that have failure codes or other problems (or potential problems) identified in the FFDC information 106, and sort the list file 110 so that such entries are indicated at a top of the listing, thus indicating that these entries have high priority. In this regard, the second analysis module 112 can generate a sorted output file 114 from the list file 110. The sorted output file 114 can be an XML file, or generated using any other suitable file format.

In one arrangement, if the software that crashed is a transaction system, modules running simultaneously on other threads likely would be of interest, and can be included in the sorted output file 114. Such modules can be accorded high priority in the sorted output file 114.

The third analysis module 116 can access the sorted output file 114, identify entries contained in the sorted output file 114 and, based on these entries, generate one or more queries to query a service database 118 containing source code and listings. More particularly, the queries can request source code for modules that correspond to the entries contained in the sorted output file 114, and listings of maintenance, such as program temporary fixes (PTFs), that have been applied to the modules. The third analysis module 116 can receive from the service database 118 the requested information, and generate an output file 120 that includes a list of specific versions of modules indicated in the dump file 102, the source code for such modules, and indicates the maintenance that has been applied to the various modules. The output file 120 can be presented to a user, thus allowing the user to view the source code and maintenance listings for the modules at levels that correspond to those which are indicated by the dump file 102. The output file 120 can be presented on a display, in a printout, or in any other suitable manner.

The fourth analysis module 122 also can access the sorted output file 114 to generate a recommended maintenance report 124. In illustration, the fourth analysis module 122 can identify entries contained in the sorted output file 114 and, based on these entries, generate one or more queries to query a service database 126 containing entries for a change management system. For example, the fourth analysis module 122 can query the service database 126 to identify the latest available maintenance updates (e.g., PTFs) for the modules identified in the sorted output file 114. The fourth analysis module 122 can receive from the service database 126 the information indicating the latest available maintenance updates, and compare such maintenance updates to the maintenance updates which actually were in use when the dump file 102 was generated, and determine whether there are additional maintenance updates identified in the service database 126 which have not been applied to the modules. Any such additional maintenance updates can be indicated in the recommended maintenance report 124, and the recommended maintenance report 124 can be presented to the user. The recommended maintenance report 124 can be presented on a display, in a printout, or in any other suitable manner.

The user can review the output file 120 and recommended maintenance report 124 to glean in depth information related to the cause of a software crash, as well maintenance recommended for the software which crashed, and decide whether to apply such maintenance in order to mitigate the risk of future software crashes.

Figure 2:
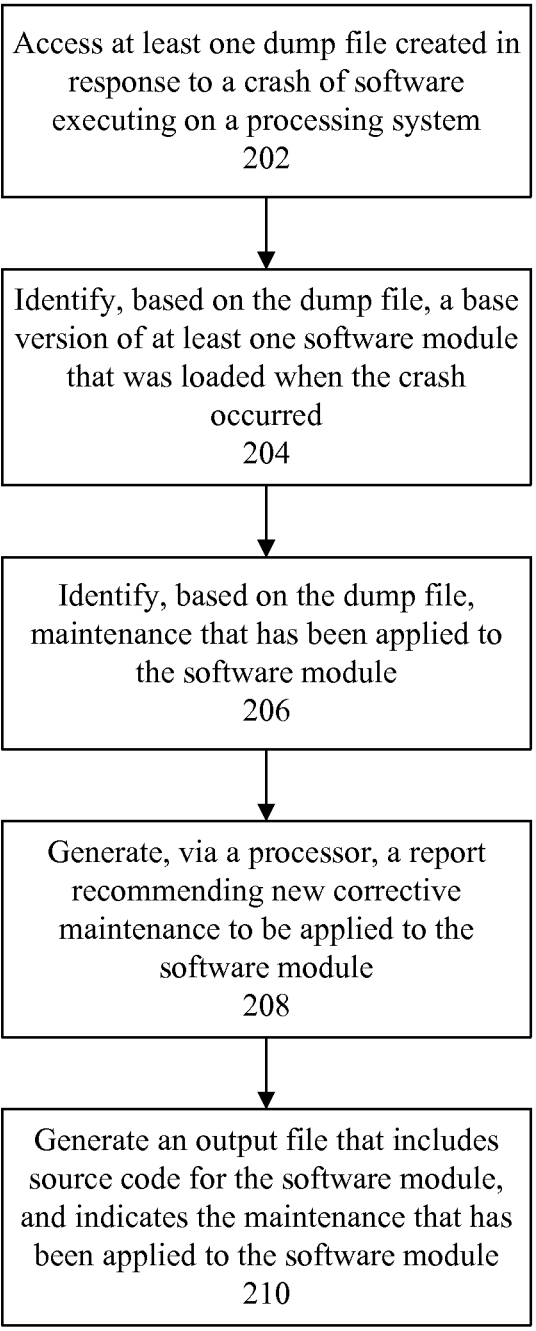
FIG. 2 is a flow chart illustrating a method of analyzing a software error in accordance with one embodiment disclosed within this specification.

FIG. 2 is a flow chart illustrating a method 200 of analyzing a software error in accordance with one embodiment disclosed within this specification. At step 202, at least one dump file created in response to a crash of software executing on a processing system can be accessed. At step 204, based on the dump file, a base version of at least one software module that was loaded when the crash occurred can be identified. At step 206, based on the dump file, maintenance that has been applied to the software module can be identified. At step 208, a report recommending new corrective maintenance to be applied to the software module can be generated via a processor. At step 210, an output file can be generated. The output file can include source code for the software module, and can indicate the maintenance that has been applied to the software module. As noted, the recommended maintenance report and the output file can be generated by processing a sorted output file in which entries for modules that have failure codes or other problems (or potential problems) identified in the FFDC information are indicated at a top of the listing, thus indicating that these entries have high priority.

Figure 3:
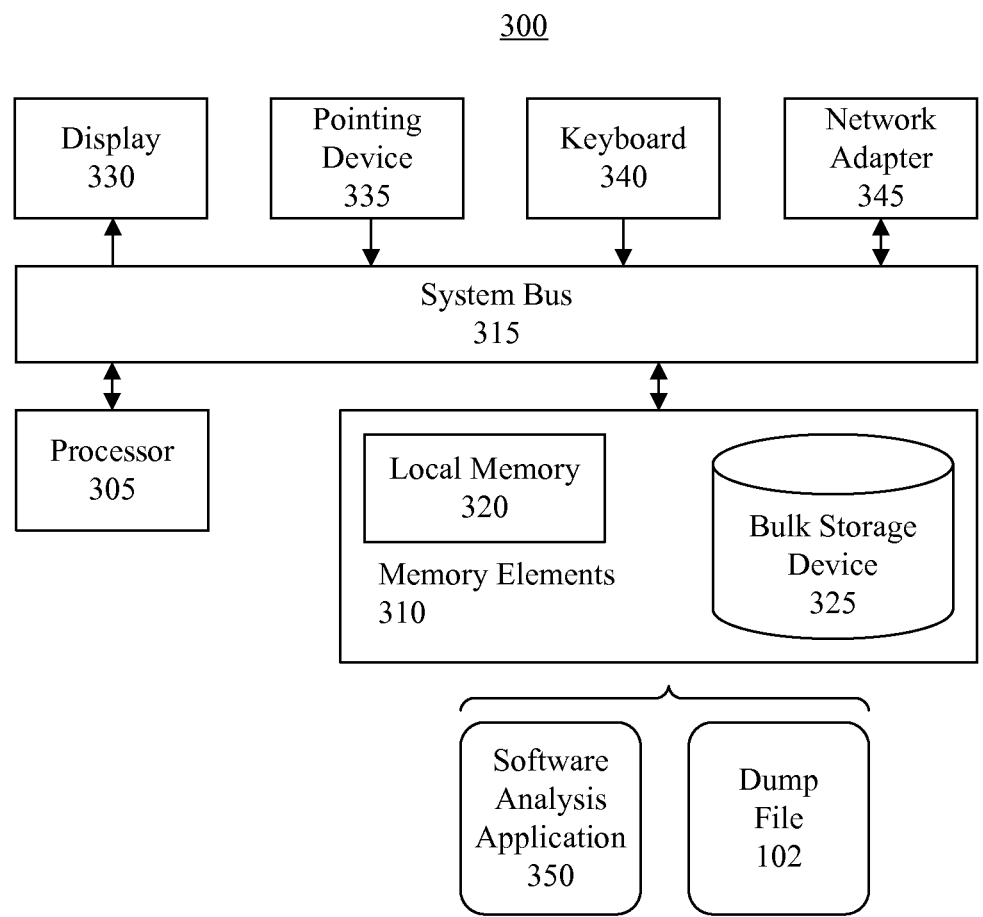
FIG. 3 is a block diagram illustrating a system for analyzing a software error in accordance with one embodiment disclosed within this specification.

FIG. 3 is a block diagram illustrating a system 300 for analyzing a software error in accordance with one embodiment disclosed within this specification. The system 300 can include at least one processor 305 (e.g., a central processing unit) coupled to memory elements 310 through a system bus 315 or other suitable circuitry. As such, the system 300 can store program code within the memory elements 310. The processor 305 can execute the program code accessed from the memory elements 310 via the system bus 315. It should be appreciated that the system 300 can be implemented in the form of any system including a processor and memory that is capable of performing the functions and/or operations described within this specification. For example, the system 300 can be implemented as a computer, a workstation, a mobile computer, a laptop computer, tablet computer, a smart phone, a personal digital assistant, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the system 300. The I/O devices can be coupled to the system 300 either directly or through intervening I/O controllers. For example, the display 330 can be coupled to the system 300 via a graphics processing unit (GPU), which may be a component of the processor 305 or a discrete device. One or more network adapters 345 also can be coupled to system 300 to enable system 300 to become coupled to other systems, computer systems, remote printers, and/or remote storage devices through intervening private or public networks. Modems, cable modems, and Ethernet cards are examples of different types of network adapters 345 that can be used with system 300.

As pictured in FIG. 3, the memory elements 310 can store a software analysis application 350 configured to perform the processes and methods described herein. In illustration, the software analysis application 350 can include the analysis modules 108, 112, 116, 122 discussed in FIG. 1, and generate the list file 110, the sorted output file 114, the output file 120 and the recommended maintenance report 124 also discussed in FIG. 1. Being implemented in the form of executable program code, the software analysis application 350 can be executed by the system 300 and, as such, can be considered part of the system 300. In this regard, the software analysis application 350 is a functional data structure that imparts functionality when employed as part of the processing system of FIG. 3.

In one arrangement, the memory elements 310 also can store the dump file 102 of FIG. 1. In another arrangement, the system 300 can access the dump file 102 from another system or device. The dump file 102 also is a function data structure that imparts functionality when processed by the system 300.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of analyzing a software error, the method comprising:
   accessing at least one dump file created in response to a crash of software executing on a processing system;
   identifying, based on the dump file, a base version of at least one software module that was loaded when the crash occurred;
   identifying, based on the dump file, maintenance that has been applied to the software module;
   generating, via a processor, a report recommending new corrective maintenance to be applied to the software module;
   generating a list file comprising a list of entries, at least one of the entries identifying the at least one software module;
   extracting from the dump file first failure data capture information;
   determining that the first failure data capture information identifies at least one failure code or problem that corresponds to the entry in the list file identifying the at least one software module; and
   sorting the list file to generate a sorted output file indicating the entry identifying the at least one software module as having high priority.

2. The method of claim 1, further comprising:
   generating an output file that comprises source code for the at least one software module, and indicates the maintenance that has been applied to the at least one software module.

3. The method of claim 1, wherein identifying, based on the dump file, the base version of the at least one software module that was loaded when the crash occurred comprises:
   processing memory structures contained in the dump file to locate areas in the memory structures that contain information about the at least one software module that was loaded when the crash occurred.

4. The method of claim 3, wherein processing the memory structures contained in the dump file comprises:
   identifying entries in a loader domain and a program manager domain.

5. The method of claim 1, wherein generating the report recommending new corrective maintenance to be applied to the at least one software module comprises:
   identifying the at least one software module in the sorted output file;
   receiving from a service database information indicating a latest available maintenance update for the at least one software module;
   determining whether the maintenance that has been applied to the at least one software module includes the latest available maintenance update; and when the maintenance that has been applied to the at least one software module does not include the latest available maintenance update, indicating the latest available maintenance update in the report recommending new corrective maintenance to be applied to the at least one software module.

6. The method of claim 1, further comprising:
identifying the at least one software module in the sorted output file;
receiving from a service database source code for the at least one software module and a listing of the maintenance that has been applied to the at least one software module; and
generating an output file that comprises the source code for the at least one software module, and indicates the maintenance that has been applied to the at least one software module.

7. A system comprising:
a processor programmed to initiate executable operations comprising:
accessing at least one dump file created in response to a crash of software executing on a processing system;
identifying, based on the dump file, a base version of at least one software module that was loaded when the crash occurred;
identifying, based on the dump file, maintenance that has been applied to the at least one software module;
generating a report recommending new corrective maintenance to be applied to the at least one software module;
generating a list file comprising a list of entries, at least one of the entries identifying the at least one software module;
extracting from the dump file first failure data capture information;
determining that the first failure data capture information identifies at least one failure code or problem that corresponds to the entry in the list file identifying the at least one software module; and
sorting the list file to generate a sorted output file indicating the entry identifying the at least one software module as having high priority.

8. The system of claim 7, the processor further programmed to initiate executable operations comprising:
generating an output file that comprises source code for the at least one software module, and indicates the maintenance that has been applied to the at least one software module.

9. The system of claim 7, wherein identifying, based on the dump file, the base version of the at least one software module that was loaded when the crash occurred comprises:
processing memory structures contained in the dump file to locate areas in the memory structures that contain information about the at least one software module that was loaded when the crash occurred.

10. The system of claim 9, wherein processing the memory structures contained in the dump file comprises:
identifying entries in a loader domain and a program manager domain.

11. The system of claim 7, wherein generating the report recommending new corrective maintenance to be applied to the at least one software module comprises:
identifying the at least one software module in the sorted output file;
receiving from a service database information indicating a latest available maintenance update for the at least one software module;
determining whether the maintenance that has been applied to the at least one software module includes the latest available maintenance update; and
when the maintenance that has been applied to the at least one software module does not include the latest available maintenance update, indicating the latest available maintenance update in the report recommending new corrective maintenance to be applied to the at least one software module.

12. The system of claim 7, the processor further programmed to initiate executable operations comprising:
identifying the at least one software module in the sorted output file;
receiving from a service database source code for the at least one software module and a listing of the maintenance that has been applied to the at least one software module; and
generating an output file that comprises the source code for the at least one software module, and indicates the maintenance that has been applied to the at least one software module.

13. A computer program product for analyzing a software error, the computer program product comprising
a computer readable storage device having program code stored thereon, the program code executable by a processor to perform a method comprising:
accessing, via the processor, at least one dump file created in response to a crash of software executing on a processing system;
identifying via the processor, based on the dump file, a base version of at least one software module that was loaded when the crash occurred;
identifying via the processor, based on the dump file, maintenance that has been applied to the at least one software module;
generating, via the processor, a report recommending new corrective maintenance to be applied to the at least one software module;
generating a list file comprising a list of entries, at least one of the entries identifying the at least one software module;
extracting from the dump file first failure data capture information;
determining that the first failure data capture information identifies at least one failure code or problem that corresponds to the entry in the list file identifying the at least one software module; and
sorting the list file to generate a sorted output file indicating the entry identifying the at least one software module as having high priority, wherein
the computer readable storage device is not a transitory, propagating signal per se.

14. The computer program product of claim 13, the method further comprising:
generating, via the processor, an output file that comprises source code for the at least one software module, and indicates the maintenance that has been applied to the at least one software module.

15. The computer program product of claim 13, wherein identifying, based on the dump file, the base version of the at least one software module that was loaded when the crash occurred comprises:
processing memory structures contained in the dump file to locate areas in the memory structures that contain information about the at least one software module that was loaded when the crash occurred.

16. The computer program product of claim 13, wherein generating the report recommending new corrective maintenance to be applied to the at least one software module comprises:

identifying, via the processor, the at least one software module in the sorted output file;

receiving, via the processor, from a service database information indicating a latest available maintenance update for the at least one software module;

determining, via the processor, whether the maintenance that has been applied to the at least one software module includes the latest available maintenance update; and when the maintenance that has been applied to the at least one software module does not include the latest available maintenance update, indicating, via the processor, the latest available maintenance update in the report recommending new corrective maintenance to be applied to the at least one software module.

17. The computer program product of claim 13, the method further comprising:

identifying, via the processor, the at least one software module in the sorted output file;

receiving from a service database, via the processor, source code for the at least one software module and a listing of the maintenance that has been applied to the at least one software module; and generating, via the processor, an output file that comprises the source code for the at least one software module, and indicates the maintenance that has been applied to the at least one software module.

\* \* \* \* \*